No. 793,630. PATENTED JULY 4, 1905.
A. ARMITAGE.
GRAIN DRILL.
APPLICATION FILED DEC. 29, 1904.

2 SHEETS—SHEET 1.

Witnesses.
Walter B. Payne.
G. Willard Rich.

Inventor.
Albert Armitage
by
Frederick S. Church
his Attorney.

No. 793,630. PATENTED JULY 4, 1905.
A. ARMITAGE.
GRAIN DRILL.
APPLICATION FILED DEC. 29, 1904.
2 SHEETS—SHEET 2.
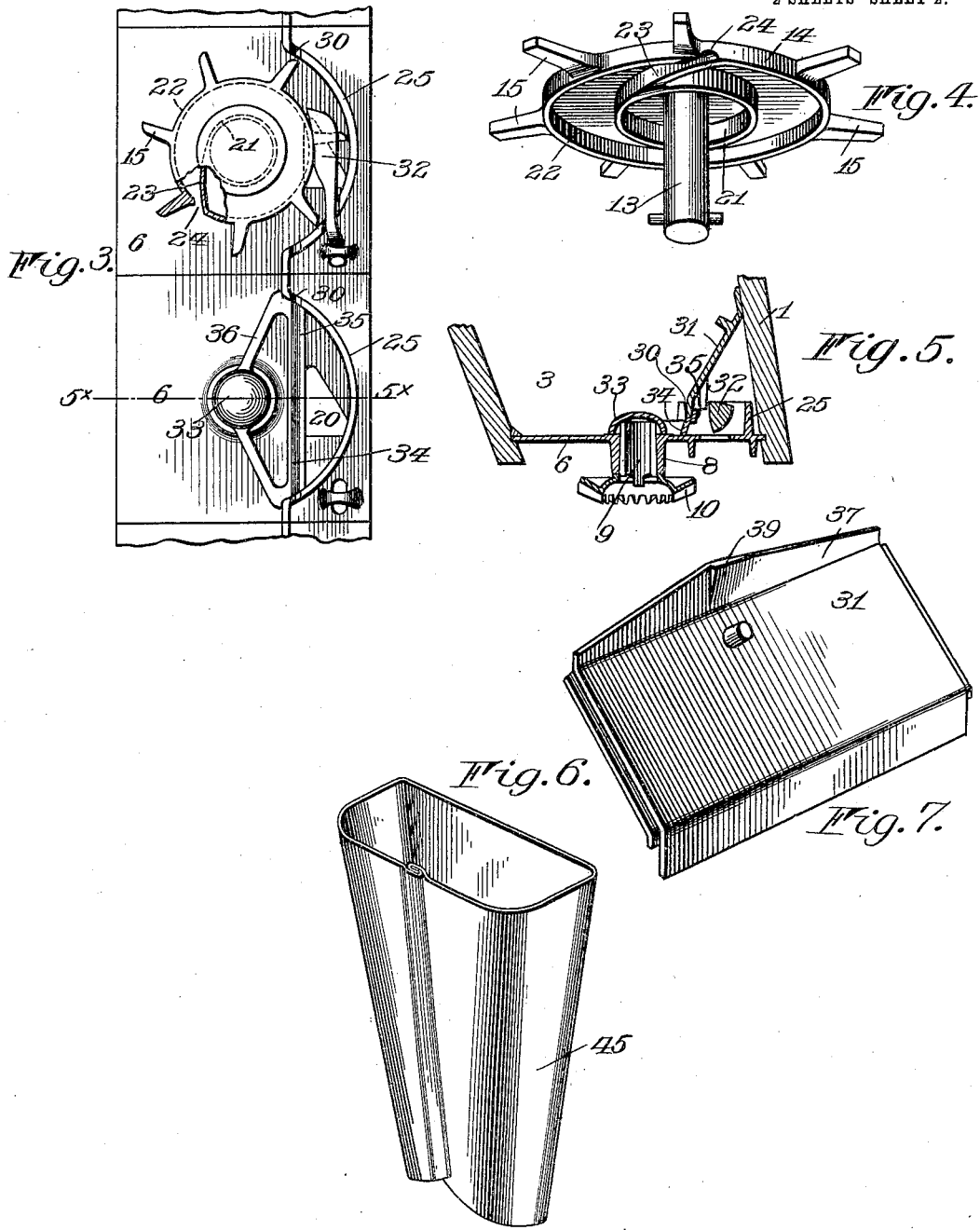
Witnesses.
Walter B. Payne.
Willard Rich.
Inventor.
Albert Armitage
by Frederick G. Church
his Attorney.

No. 793,630.

Patented July 4, 1905.

UNITED STATES PATENT OFFICE.

ALBERT ARMITAGE, OF FAIRPORT, NEW YORK, ASSIGNOR TO ONTARIO DRILL COMPANY, OF DESPATCH, NEW YORK, A CORPORATION OF NEW YORK.

GRAIN-DRILL.

SPECIFICATION forming part of Letters Patent No. 793,630, dated July 4, 1905.

Application filed December 29, 1904. Serial No. 238,781.

*To all whom it may concern:*

Be it known that I, ALBERT ARMITAGE, of Fairport, in the county of Monroe and State of New York, have invented certain new and useful Improvements in Grain-Drills; and I do hereby declare the following to be a full, clear, and exact description of the same, reference being had to the accompanying drawings, forming a part of this specification, and to the reference-numerals marked thereon.

My present invention relates to grain-drills or machines for planting various kinds of grain or seed; and it has for its object to provide a new and improved fertilizer-distributing mechanism therefor whereby the fertilizing material may be fed in desired quantities and conducted from the hopper to the grain-planting tools without the liability of a portion thereof being wasted by passing outside of the conductor.

The invention has for its further object to provide an improved hopper-bottom, a distributer-wheel operating therein, and means for closing the apertures in said bottom when the wheel is not in use.

To these and other ends the invention consists in certain improvements and combinations of parts, all as will be hereinafter more fully explained, the novel features being pointed out in the claims at the end of this specification.

Figure 1:
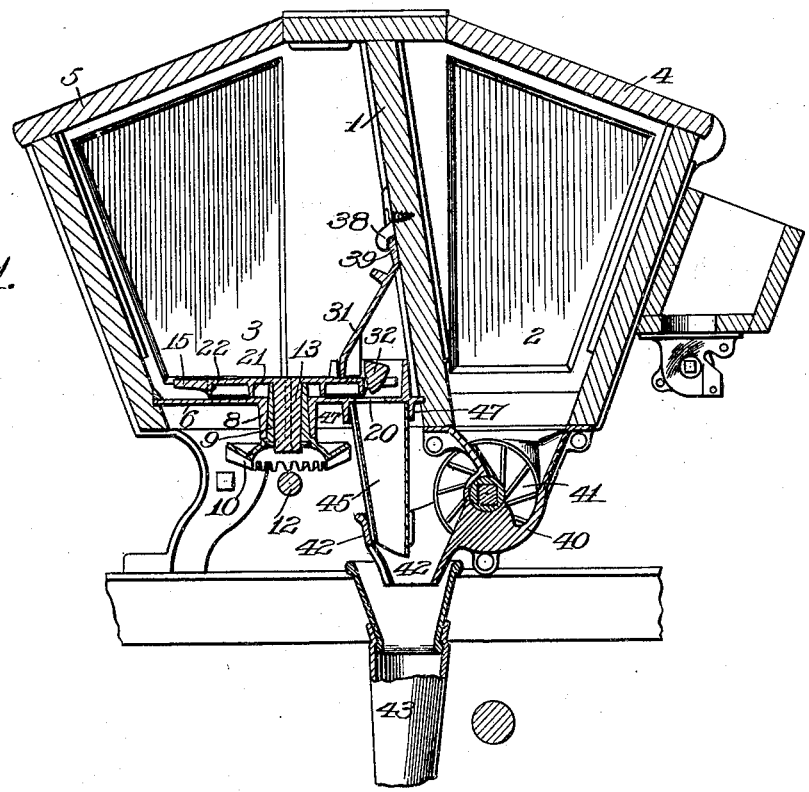
Figure 2:
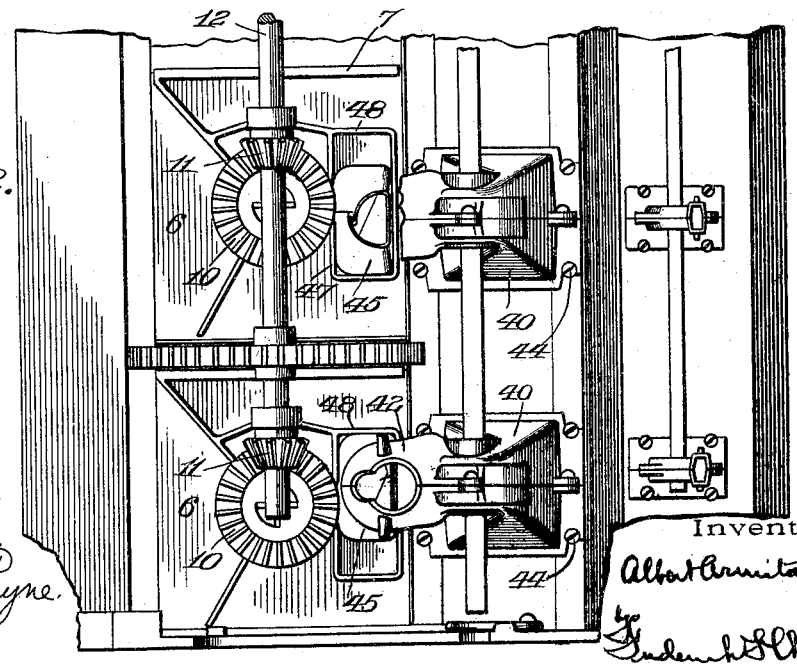

In the drawings, Figure 1 is a cross-sectional view of a grain-drill hopper with the devices embodying my invention applied thereto. Fig. 2 is a bottom plan view. Fig. 3 is a detail plan view, showing the fertilizer-distributing wheel and the cap or closure for the apertures in the hopper-bottom when the wheel is removed. Fig. 4 is a detail perspective view of the fertilizer-feed wheel. Fig. 5 is a detail sectional view on the line $5^x 5^x$ of Fig. 3. Fig. 6 is a detail perspective view of the fertilizer-conductor, and Fig. 7 is a perspective view of the fertilizer-gate.

Similar reference-numerals in the several figures indicate similar parts.

My invention is adapted to be applied particularly to grain-drills or seeding-machines, the standard form of which is provided with a box or hopper, such as shown in Fig. 1, divided longitudinally by a partition 1 into chambers 2 and 3, the former being closed by a top or cover 4 and adapted to contain the grain or seed to be planted, while the chamber 3, which is closed by the door 5, is adapted to contain the fertilizer, the latter being deposited in desired quantities at proper intervals by suitable distributing mechanism and deposited with the grain which is fed from the chamber 2, as will be more fully described.

The bottom of the chamber 3 or fertilizer-hopper is composed of a series of cast-iron plates 6 of equal size, the proximate edges of which abut, each plate being provided at one edge with a flange or ledge 7, Fig. 2, adapted to extend beneath the edge of the adjacent plate to close the joint between said plates. At the center of each plate 6 are apertured hubs 8, in which are journaled the tubular axle 9 of a driving gear-wheel 10, adapted to be rotated in the usual manner by a pinion 11, on the shaft 12. Removably secured to the pinion 10 is the journal 13, extending downwardly from the feed-wheel 14, the radially-extending fingers 15 of which rotate above a discharge-aperture 20 in the respective plate 6. Owing to the semiplastic condition of commercial fertilizer and its tendency to adhere to and to become hardened on metallic portions of the hopper and feeding mechanism, the feed-wheel is constructed particularly with the view to preventing the accumulation of fertilizer beneath it. Encircling the pin 13 is a ring 21, which is slightly deeper than the rim 22 of the wheel and rests against the surface of the plate 6 or a small boss provided thereon. This ring being smaller in diameter than the extreme diameter of the wheel, it will be seen that the friction between it and the plate will be greatly reduced. The fertilizer which may tend to gradually work its way beneath the rim 22 of the wheel is removed by a scraper formed on the lower side of the wheel by a wall 23, extending at an angle to the direction of rotation of the wheel, its inner end leading from the side of the ring 21, while its outer end extends rearwardly and terminates in the rim 22 behind a notch 24 therein. The latter is located in rear of and adjacent to one of the radially-extending fingers 15, for as the latter are rotated through the mass of fertilizer in the hopper 3 the material will be compact in advance of each of the fingers; but at the rear side thereof a space will be left, and into one of these spaces the material from beneath the wheel is constantly swept by the scraper. Extending around the rear side of the aperture 20 on each of the plates 6 is the usual curved back wall 25, the forward edges of which are provided with notches 30, adapted to receive the depending edge of a gate or cover-plate 31, extending outwardly and downwardly from the partition or side wall 1 of the hopper, to which it is removably attached, normally covering the depositing portion of the wheel to prevent the mass of fertilizer from interfering with the proper operation of the hammer or ejector 32, which operates to discharge the quantity of fertilizer carried between the arms into the aperture 20. At the upper edge of the gate or cover-plate 31 is an angular extending flange 37, adapted to bear against the face of the partition 1, where it is removably secured by a button 38, journaled on the partition and having the overhanging end coöperating with a beveled or slightly-inclined surface 39 on the face of the flange. This is a simple and advantageous means of securing the gate, as its lower edge is held in the notches 30 and its upper edge securely fastened by the button engaging the inclined surface. It is locked in position without notching the partition 1 or placing projections or other obstructions in the fertilizer-hopper.

In planting certain kinds of grain or seeds only alternate distributers or every third or fourth distributer may be used for planting rows greater or less distances apart, and it is then desirable to remove the fertilizer-feed wheels in all except those corresponding to the rows to be planted; but as this will then leave the central aperture and the discharge-aperture 20 open in those plates 6 from which the feed-wheels have been removed means are required for preventing the passage of fertilizer therethrough. In the present instance the central aperture on the plate is closed by a cap 33, and the aperture 20 is closed off by a bar 34, extending beneath the plate 31 and between the ends of the back wall 25, said bar being held in place by an upwardly-extending rim or flange 35, projecting in rear of the plate 31, and by connecting it by arms 36 with the cap 33, as shown in Figs. 3 and 5, an integral structure may be provided which is easily removed and inserted by the operator.

The grain or seed contained in the hopper or chamber 2 is removed by means of the usual or any preferred form of feeding devices, those in the present illustration embodying a frame or casting 40, containing the feeding-wheel 41, which deposits the grain into a spout 42, leading to the tool or furrow-opener. (Not shown.) As the fertilizer also passes through the same conductor, the spout of each extends beneath its corresponding fertilizer-hopper bottom and is located approximately in alinement with the discharge-aperture 20 thereof. It frequently occurs, however, on account of the various devices, such as the speed gearing or regulating mechanism and the devices for adjusting the tools which are applied to grain-drills, that the grain-feed devices projecting beneath the box or hopper cannot be alined accurately with the discharge-aperture 20 of their corresponding fertilizer-distributer. For this reason the frames 40 are adjustable on the bottom of the hopper and are secured thereto by screws 44, as shown in Fig. 2. To permit this adjustment and also to guide the fertilizer into the conveyer 42, I provide a branch conveyer or spout in the form of a tubular conductor 45, supported at its lower end on the spout 42 and having its enlarged upper end surrounding the aperture 20 and abutting against the lower side of the plate 6. The upper end of this spout is made of sufficient width so that it may be adjusted laterally a considerable distance without uncovering either end of the discharge-aperture 20, and to securely hold it in place its upper end is engaged by depending side walls 47, which are joined by end walls 48. This means of supporting the fertilizer-conductor is an advantageous one, as the conductor is securely held both at its upper and lower ends and cannot be displaced accidentally. Further, as there is no opening beneath the plates 6 strong currents of air passing through beneath the hopper cannot divert portions of the fertilizer by blowing it away from the conveyer, either to waste it by scattering it broadcast or to interfere with the proper operation of the various parts of the machine by depositing it thereon.

The fertilizer-feeding devices described herein are simple in construction, and the various features shown combine to produce a mechanism which facilitates assembling the parts during the construction of the grain-drill and which may be readily adjusted by the operator.

I claim as my invention—

1. In a grain-drill, the combination with a hopper, an apertured bottom thereon and a distributing device for depositing material through said aperture, of a conveyer separate from the bottom abutting the lower side thereof and surrounding the aperture and means for holding it in engagement with said bottom.

2. In a grain-drill, the combination with a hopper an apertured bottom and a distributing device for depositing material through said aperture, of a cover-plate extending over the aperture having a portion engaging the side of the hopper and a locking device on the latter detachably engaging the plate.

3. In a grain-drill, the combination with a hopper, having an apertured bottom, a wall on the lower side of the bottom surrounding the aperture and means for distributing material through the aperture, of a second hopper in proximity to the first mechanism, means for feeding material therefrom and a conveyer for said material, a conductor leading into the conveyer having its upper end projecting within the walls and surrounding the aperture in the bottom of the first-mentioned hopper.

4. In a grain-drill, the combination with a hopper an apertured bottom therefor and means for distributing material through the aperture, of a wall on the bottom surrounding the latter, a conductor having its upper end arranged beneath the aperture and within the wall and means for supporting the conductor independently of the bottom of the hopper.

5. In a grain-drill, the combination with a hopper, an apertured bottom therefor, and means for distributing material through the aperture, of parallel walls at opposite sides of the aperture extending longitudinally of the bottom and end walls connecting them, a conductor arranged beneath the aperture and engaged between the longitudinally-extending walls and adjustable relatively between the end walls.

6. The combination with a hopper adapted to contain material to be distributed and a bottom therefor having a central aperture and a distributing-aperture, of a cap for the central aperture, a cover-plate detachably mounted on the hopper and extending over the distributing-aperture and a locking-piece on the cap engaged by the plate.

7. The combination with a hopper adapted to contain material to be distributed having a side and a bottom for the hopper having a central aperture and a distributing-aperture, of a cover-plate detachably supported on the side of the hopper and projecting over the distributing-aperture into proximity with the bottom, a cap for closing the central aperture and a bar on the cap engaging the cover-plate to close the space between the latter and the bottom.

8. The combination with a hopper adapted to contain material to be distributed having a side and a bottom for the hopper having a central aperture and a distributing-aperture and provided with a rim extending in rear of the discharge-aperture having the ends projecting forwardly thereof, of a cover-plate resting on the ends of the rim and detachably connected to the side of the hopper, a cap for the central aperture, a bar thereon closing the space between the cover-plate and hopper-bottom and included between the ends of the rim and a flange on the bar projecting in rear of the cover.

9. The combination with a hopper adapted to contain material to be deposited having a bottom provided with a central aperture and a depositing-aperture through which material may be fed, of a single member for closing both apertures and means for detachably holding it in operative position.

10. The combination with a hopper having an apertured bottom, of a feed-wheel, a depending rim thereon provided with a notch, a feeding-arm arranged on the rim in front of the notch, a second arm projecting in rear thereof and a wall on the lower side of the wheel inclined relatively to the direction of rotation having its outer end arranged in rear of said notch and in front of the second arm and means for rotating the wheel.

11. The combination with a hopper having an apertured bottom, of a feed-wheel, a depending rim thereon provided with a notch and a central rim resting on the bottom of the hopper and supporting the wheel, a wall extending outwardly and rearwardly therefrom relatively to the direction of movement of the wheel and terminating in rear of the notch in the rim.

ALBERT ARMITAGE.

Witnesses:
   J. L. THISTLETHWAITE,
   C. J. THISTLETHWAITE.